US012572354B2

(12) United States Patent
Kumar

(10) Patent No.: US 12,572,354 B2
(45) Date of Patent: Mar. 10, 2026

(54) CI/CD TEMPLATE FRAMEWORK FOR DevSecOps TEAMS

(71) Applicant: Citizant, Inc., Chantilly, VA (US)

(72) Inventor: Rupesh Kumar, Gainesville, VA (US)

(73) Assignee: Citizant, Inc., Chantilly, VA (US)

( * ) Notice: Subject to any disclaimer, the term of this patent is extended or adjusted under 35 U.S.C. 154(b) by 0 days.

(21) Appl. No.: 17/891,994

(22) Filed: Aug. 19, 2022

(65) Prior Publication Data

US 2023/0056223 A1 Feb. 23, 2023

Related U.S. Application Data

(60) Provisional application No. 63/235,089, filed on Aug. 19, 2021.

(51) Int. Cl.
*G06F 9/44* (2018.01)
*G06F 8/77* (2018.01)
*G06F 21/62* (2013.01)

(52) U.S. Cl.
CPC ............ *G06F 8/77* (2013.01); *G06F 21/6209* (2013.01)

(58) Field of Classification Search
CPC .............................. G06F 8/77; G06F 21/6209
See application file for complete search history.

(56) References Cited

U.S. PATENT DOCUMENTS

| | | | |
|---|---|---|---|
| 10,027,540 B2 | 7/2018 | Deklich et al. | |
| 10,255,370 B2 | 4/2019 | Carpenter et al. | |
| 10,382,491 B2 | 8/2019 | DiGiambattista et al. | |
| 10,528,367 B1 | 1/2020 | Liu et al. | |
| 2002/0049815 A1* | 4/2002 | Dattatri | G06Q 30/06 |
| | | | 709/206 |
| 2016/0154629 A1* | 6/2016 | Noens | G06F 8/30 |
| | | | 717/107 |
| 2016/0299829 A1 | 10/2016 | Wei et al. | |
| 2017/0249374 A1* | 8/2017 | Parees | G06F 9/44 |
| 2018/0364985 A1 | 12/2018 | Liu et al. | |
| 2020/0204468 A1 | 6/2020 | Nickolov et al. | |
| 2022/0350596 A1* | 11/2022 | Bregman | G06F 9/4881 |

(Continued)

FOREIGN PATENT DOCUMENTS

| | | |
|---|---|---|
| CN | 109189680 | 8/2019 |
| CN | 111309441 | 6/2020 |
| WO | 2019113216 | 6/2019 |

OTHER PUBLICATIONS

Bigelow, "CI/CD pipelines explained: Everything you need to know," TechTarget, May 2021, [online], [retrieved on Nov. 18, 2022] Retrieved from the Internet: <URL: http://www.techtarget.com/searchsoftwarequality/CI-CD-pipelines-explained-Everything-you-need-to-know>.

(Continued)

*Primary Examiner* — Hang Pan
(74) *Attorney, Agent, or Firm* — Arnall Golden Gregory LLP

(57) ABSTRACT

Described herein are systems utilizing a DevSecOps model comprising a CI/CD template, framework interfacing with a CI/CD pipeline that can integrate the assemblage of software components that collectively automate the building, testing, and delivery of applications within various hosting environments. Also described herein are methods utilizing the aforementioned systems.

24 Claims, 2 Drawing Sheets

(56)          References Cited

U.S. PATENT DOCUMENTS

2022/0391199 A1* 12/2022 Ashrafzadeh ............. G06F 8/71

OTHER PUBLICATIONS

International Search Report and Written Opinion for PCT/US2022/040958, mailed Dec. 15, 2022.

Myrbakken et al., "DevSecOps: A Multivocal Literature Review," International Conference on Software Process Improvement and Capability Determination. Springer, Cham, 2017, [online], [retrieved on Nov. 18, 2022] Retrieved from the Internet: <URL: http:///link.springer.com/chapter/10.1007/978-3-319-67383-7_2>.

Rangnau et al., "Continuous Security Testing: A Case Study on Integrating Dynamic Security Testing Tools in CI/CD Pipelines," 2020 IEEE 24th International Enterprise Distributed Object Computing Conference (EDOC). IEEE, 2020, [online], [retrieved on Nov. 18, 2022] Retrieved from the Internet: <URL: https://ieeexplore.ieee.org/abstracVdocumenU9233212>.

Widder et al., "A conceptual replication of continuous integration pain points in the context of Travis CI," Proceedings of the 2019 27th ACM Joint Meeting on European Software Engineering Conference and Symposium on the Foundations of Software Engineering, 2019, [online], [retrieved on Nov. 18, 2022] Retrieved from the Internet: <URL: https://dl.acm.org/doi/abs/10.1145/3338906.3338922>.

Gamma et al., Design Patterns: Elements of Reusable Object-Oriented Software. Reading, Mass.:Addison-Wesley, 1995[online], [retrieved on Jul. 23, 2024]. Retrieved from the Internet: <URL: chrome-extension://efaidnbmnnnibpcajpcglclefindmkaj/http://www.uml.org.cn/c++/pdf/designpatterns.pdf>.

Laster, "Introduction to writing pipelines-as-code and implementing DevOps with Jenkins 2", Opensource.com, 2018, [online], [retrieved on Jul. 23, 2024]. Retrieved from the Internet: <URL: https://opensource.com/article/18/8/devops-jenkins-2>.

Vishwakarma, "How to Use the Jenkins Pipelines", Blogs DevOps and Open Technologies, 2018, [online], [retrieved on Jul. 23, 2024]. Retrieved from the Internet: <URL: https://devops.com/how-to-use-the-jenkins-pipelines/>.

Azure DevOps Labs, "Configuring a CD pipeline for your Jenkins CI", [online], published Jul. 29, 2020, [retrieved on Sep. 17, 2024]. Retrieved from the Internet: <URL: https://azuredevopslabs.com/labs/vstsextend/Jenkins/>.

Chan, "The IRS saved 25,000 hours of work by adopting new technology to automate code testing and releases," Business Insider, 2021. Retrieved from the Internet: <URL: https://www.businessinsider.com/citizant-devops-irs-tax-season-software-development-2021-4>.

* cited by examiner

CI/CD TEMPLATE FRAMEWORK FOR DevSecOps TEAMS

CROSS-REFERENCE TO RELATED APPLICATIONS

This Application claims the benefit of U.S. Provisional Application No. 63/235,089 filed on Aug. 19, 202.1 and U.S. Provisional Application No. 63/067,586 filed on Aug. 19, 2020, the disclosure of which is incorporated herein by reference.

BACKGROUND

The present invention generally relates to systems and methods for developing software collaborating under a Development, Security, and Operations (DevSecOps) protocol.

SUMMARY

Embodiments relate to a Continuous Integration and Continuous Delivery/Deployment template (CI/CD template) that reduces software development time under a DevSecOps protocol. Embodiments allow for the seamless integration of many applications by eliminating manual processing steps and for applications to be deployed to any environment without human intervention. Embodiments also ensure equality and security is maintained, allow for use in a containerization platform to minimize human error accommodate a vast assortment of complex technology tool stacks, and minimize cost and effort required to run DevSecOps processes.

These and other feature, aspects, and advantages of the present embodiments will become understood with reference to the following description, appended claims, and accompanying figures.

BRIEF DESCRIPTIONS OF THE DRAWINGS

DETAILED DESCRIPTION

Figure 1:
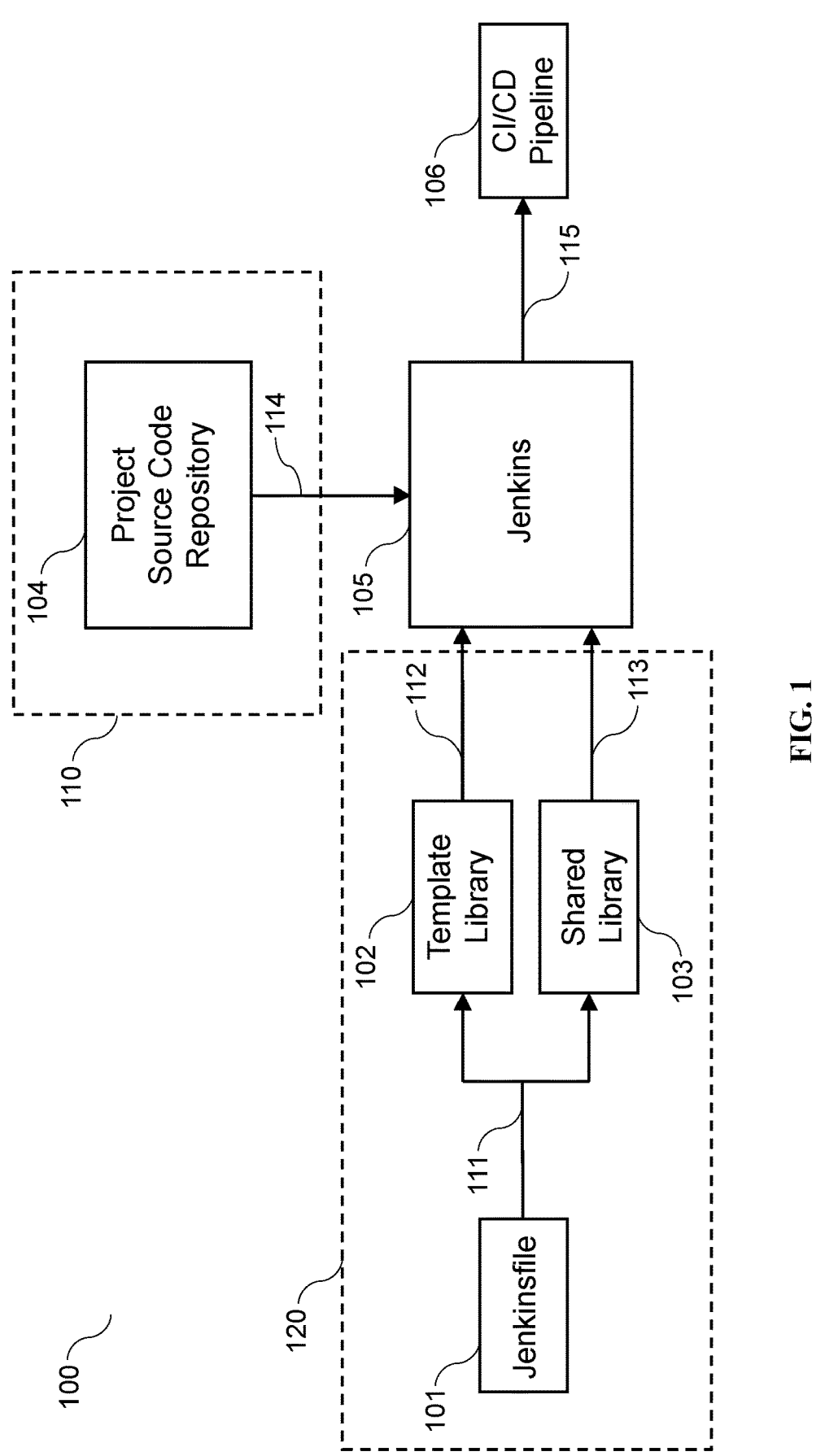
FIG. 1 depicts a CI/CD template framework according to one more embodiments of the disclosure.

Large organizations may have hundreds of software applications that they must develop and maintain in accordance with the various laws and regulations of the United States. Such applications can exist at various maturity levels, ranging from legacy/monolithic/mainframe to modular/microservices/web architectures. The Software Development Lifecycle (SDLC) of the organization can utilize various development paths, e.g., traditional Waterfall and modern Agile, which require many manual and rigorous validation steps including code check-in, deployment, and production. Accordingly, using these development paths can lead to development timelines that normally take as long as one year, and the Cost of Delay (CoD) for a finished product can be a problem, especially when parameters of the product may change frequently during the development lifecycle.

To shorten long development time and deliver new functionality to internal and external users, organizations have begun to adopt the DevSecOps model. The DevSecOps model comprises (i) Development (Dev), which includes building and testing, (ii) Security (Sec), which includes testing and compliance, and (iii) Operations (Ops), which includes hosting and maintaining. In the DevSecOps model, these steps are tightly integrated into a continuous process, rather than discrete activities. DevSecOps methods and practices emphasize constant collaboration and communication while automating the process of software creation, delivery, and maintenance. Historically, using DevSecOps with a pipeline language required the project team to be familiar with a separate scripting language, such as Python or Groovy. These shortcomings can be overcome by establishing a pipeline to automate the tasks of building, testing, deploying, and monitoring in the manner described herein.

Embodiments described herein run on a Continuous Integration (CI) server such as Jenkins, as described and defined herein, CI servers provide a high-level programmable capability using a Representational State Transfer (REST) Application Programming Interface (API) and a Command-Line Interface (CLI). Embodiments described herein provide an improved way to abstract a Jenkinsfile, e.g., reduce duplication, so that when the Jenkinsfile transferred to the software development team, the developers do not need to learn or use a separate scripting language, e.g., Groovy or Python, from the native Jenkinsfile. This strategy leverages the "gang of four" design patterns, particularly the Façade and Mediator patterns, to decouple the heavy maintenance that is required by different project teams, which permits a more template-driven approach. The inventors have found that CI and Continuous Delivery/Deployment (CD) resolve many of these concerns.

CI is a software development practice in which all developers merge code changes in a central repository multiple times a day. CD supplements this by automating the entire software release process. A CI/CD pipeline is the integrated assemblage of software components that collectively automate the building, testing, and delivery/deployment of the application to various hosting environments, e.g., Testing, Staging, and Production. Such actions simplify the onboarding onto DevSecOps CI/CD pipelines and significantly reduce the time to integrate and effectively use the program.

Exemplary embodiments of the disclosure include a new system and method that solve technological shortcomings in the prior art by enabling end users to develop a DevSecOps pipeline that is both user-friendly and flexible. This new system, illustrated in FIG. 1, comprises two main subsystems:

1. A first sub-system 110 (Pipeline Abstraction) that extracts as much project-specific metadata from a projects' source code repository and data such as thresholds, code versions, etc., which are managed and update by project teams in a provided-but-managed Jenkinsfile, and deposits this data and metadata onto the CI server using the TCP/IP protocol.

2. A second sub-system 120 (Pipeline Assembly) that extracts a template specified in the Jenkinsfile from a template library and uses various shared libraries to assemble the DevSecOps pipelines, by exporting the template file(s) to the CI server, and assembling the pipeline with the CI server.

The present embodiments provide the end user with a template and an output-based DevSecOps pipeline build system that maintains the capability to fit different requirements. Embodiments described provide an automatic method to extract the DevSecOps pipeline requirements from an end user's code repository. Embodiments can also map a huge amount of the existing public code repository with the related public CI/CD requirements/code.

At least eight technological solutions of the prior art are solved by the current disclosure:

First, the current embodiments provide a reduction in onboarding time. For example, in an organization with stringent security and interoperability requirements, making any changes to an application's code, structure, or configuration is a lengthy, involved process that requires abundant planning, testing, validation, and customization protocols including integration into various existing system components. Prior art systems involve lengthy onboarding processes across many project teams, which creates an enormous CoD. For an organization with hundreds of software applications to onboard, using prior art systems could take as long as 10 years to meet 100% DevSecOps adoption for all applications, due to the burdensome technological problems associated with the onboarding. The disclosed embodiments elucidate systems and methods using technology that enables organizations to onboard applications to the CI/CD pipeline as quickly as possible and in a manner not previously achievable. Utilizing embodiments of the present disclosure eliminates the myriad of manual steps and associated problems, such as building/compiling, running unit tests, code coverage, performing code quality scans, static code analysis, and pushing the build packages into the artifact repository.

Second, the current embodiments allow applications to remain environmentally agnostic. Using DevSecOps and a CI/CD pipeline, any application can now be deployed and implemented to any environment with no human intervention, thereby providing the technical solution of removing the necessity of project teams needing to be familiar with separate or different scripting languages, such as Python or Groovy, including the associated technological shortcomings thereof. Embodiments of the present disclosure also provide the technical solution of improving the integration of any application into preexisting structures, which would not have been previously achievable as set forth herein without the implementation of the DevSecOps and CI/CD pipeline. Previously, an organization's processes required several months to manually configure each project and environment before any functional or validation tests could be performed. The present embodiments, on the other hand, achieve a "Build Once, Deploy Anywhere" model. This allows applications to be constructed such that all external-facing configurations are parameterized so an application can be deployed automatically and at any time. This confers improved integration streamlined programming across an organization's various development, testing, or production environments and allows the user to run the automated or manual tests.

Third, the current embodiments maintain quality and security controls. Project teams need to be empowered to onboard themselves to the CI/CD pipeline, while ensuring that the Security teams and Quality Assurance teams maintain control over the security and quality thresholds that projects must meet before they can proceed to the next lifecycle stage. Fit-for-purpose, automated testing instructions in the Template Framework run various security testing applications at the code, application, and container levels.

Fourth, the current embodiments ensure maintainability of the pipeline. A CI/CD pipeline is built using code that allows it to spin up or tear down the pipeline repeatedly, as needed, and can run on virtual machines. In certain embodiments, a CI/CD pipeline comprises a containerization platform, such as Docker. Utilizing a containerization platform eliminates human error in configuring the pipeline that can cause confusion or delays, thereby improving the configuration, integration, and operation and reducing CoD of any applications utilized by an organization, along with providing a more seamless integration and configuration of the pipeline into an organization's preexisting systems. This can be referred to as a "Pipeline-as-Code" architecture, which is maintainable so that any new version/capability of any pipeline component would not require coordination with the hundreds of project teams nor require them to change their code to remain fully functional on the pipeline. In other words, any new upgrades or configuration changes to the pipeline components does not cause applications to fail on the existing pipelines. Thus, the current embodiments improve an organization's ability to upgrade and continuously utilize applications. In some embodiments, Ansible Tower and/or VMWare are used to automatically provision virtual machines and apply software patches/updates and make them fit for use against specified criteria. Further, a template framework can integrate a migration toolkit, such as RedHat Application Migration Toolkit, directly into the pipeline, which allows for the auto-discovery of an application tool stack on a given physical or virtual server, and provides real-time version-level details about each application.

Fifth, the current embodiments are designed for extensibility. In some instances, organizations may want to onboard many applications, numbering into the hundreds, to the pipeline, which previously created the challenge of creating a universal, vendor-agnostic onboarding solution that can scale and accommodate a vast assortment of complex technology tool stacks including but not limited to: (i) build tools, e.g., Ant, Maven, Gracile; (ii) source-code repository tools, e.g., RTC, ClearCase, SVN, Git, GitHub; (iii) programming languages, e.g., Java, C, C++, .NET, Cobol/ALC, Python; (iv) operating systems (OS)/platforms, e.g., Linux, zLinux, Solaris, Windows, mainframe; (v) applications servers, e.g., JBoss, WebLogic, WebSphere, Tomcat, Informatica ETL, Business Objects, Greenplum, Oracle forms; (vi) container tools, e.g., Docker, Kuberntes; and (vii) application hosting environments, e.g., on-premises data centers, AWS Gov Cloud, Azure Cloud. In some embodiments, a CI/CD template framework and CI/CD pipeline can reside in, and run on, one or more cloud-based networks, servers, or other computational arrangements. Servers based on *nix (e.g., Unix, Linux) or Windows Server with Java Development Kit (JDK) 1.8 or later, and minimum disk space and memory requirements are capable of operating a CI/CD template framework and CI/CD pipeline. The server configuration is not particularly limited In particular embodiments, a CI/CD template framework can stitch together one or more, or 10 or more different tools for a particular enterprise development environment. One strength of a CI/CD template framework of the present embodiments is that it reduces the affinity for any particular tool(s). The framework allows for any tool to be plugged into a CI/CD pipeline. The number of tools utilized is not particularly limited and the number and type would be immediately understood by an ordinarily skilled artisan in view of the instant disclosure.

Sixth, the current embodiments are designed such that environment-specific templates are decoupled from a Jenkinsfile and are solely managed by a CI/CD team. Upgrades to these templates based on new or updated environment components do not need to involve any downtime or out-of-sync drift issues.

Seventh, the current embodiments of a CI/CD template framework can enforce the DoD for each pipeline stage and ensure approval of a specific entity's standards and guidelines that can be incorporated into every stage of project's lifecycle. This is achieved through a CI/CD template framework's design, which gives the development team ownership of their Jenkinsfile by committing it to their source code repository and maintaining control of the project-specific information. A CI/CD team can advantageously control templates for different stages and pipeline tools utilizing a CI/CD template framework. An organization's cybersecurity team can control the thresholds to which projects must adhere. A CI/CD template framework can also provide flexibility to customize these thresholds on a per-application basis by updating the key-value pair(s) in their Jenkinsfile that are relevant to security testing. A CI/CD template framework can enforce security and quality by restricting access to security controls to only an organization's security team. For example, each CI/CD pipeline stage has a gate to make sure code adheres to the standards defined in the DoD. If an application does not meet the prescribed security standards, the pipeline stops and sends a failure notification to all stakeholders participating in resolving the issue, thereby improving the operation, reliability, and security of the pipeline.

Eighth, further to the advantages and solutions set forth above, the current embodiments accomplish goals with limited cost and effort. Another challenge unsolved in the prior art elates to the level of effort required to run DevSecOps processes considering an organization's limited staff and budget resources. Often, application teams cannot be burdened with the extra time required to change their application structure, code, or configuration simply to make their application suitable for onboarding to the CI/CD pipeline. By fully understanding the expectations and priorities of all stakeholders, application teams can be empowered to focus on creating business logic and adding features—rather than worrying about the intricacies of DevSecOps, as well as recoding and configuring their applications to work with various CI/CD pipeline components.

FIG. 1 is a diagram illustrating a CI/CD template framework as described by the disclosed embodiments. FIG. 1 is not intended to be an exhaustive or limited example of a CI/CD template framework to the form disclosed. The diagram was chosen to explain the principles of a CI/CD template framework and the practical application and to enable others of ordinary skill in the art to understand the disclosure for various implementation(s) with various modifications and/or any combinations of implementation(s) as are suited to the particular use contemplated.

An exemplary template framework 100, comprising a second sub-system 120, wherein the second sub-system 120 comprises a file 101, illustrated as a non-limiting Jenkinsfile, which is provided by a user and shared 111 with a template library 102 and a shared library 103, and provides information on templates to be extracted from the respective libraries. The template extracted from the template library 102 is imported to the CI server 112. The template library 102, generally provides a template to the CI server that contains at least one tool stack. The template extracted from the shared library 103 is imported to the CI server 113, and may be an environment-configuration template. The shared library 103, generally provides a template to the CI server that contains a programming and/or scripting language. The exemplary template framework 100 also comprises a first sub-system 110, wherein within the first sub-system 110 metadata from a project source code repository 104 is extracted and provided to the CI server 114. The CI server 105, illustrated as a non-limiting Jenkins sever, assembles the templates and metadata 115, to form a CI/CD pipeline 106.

Figure 2:
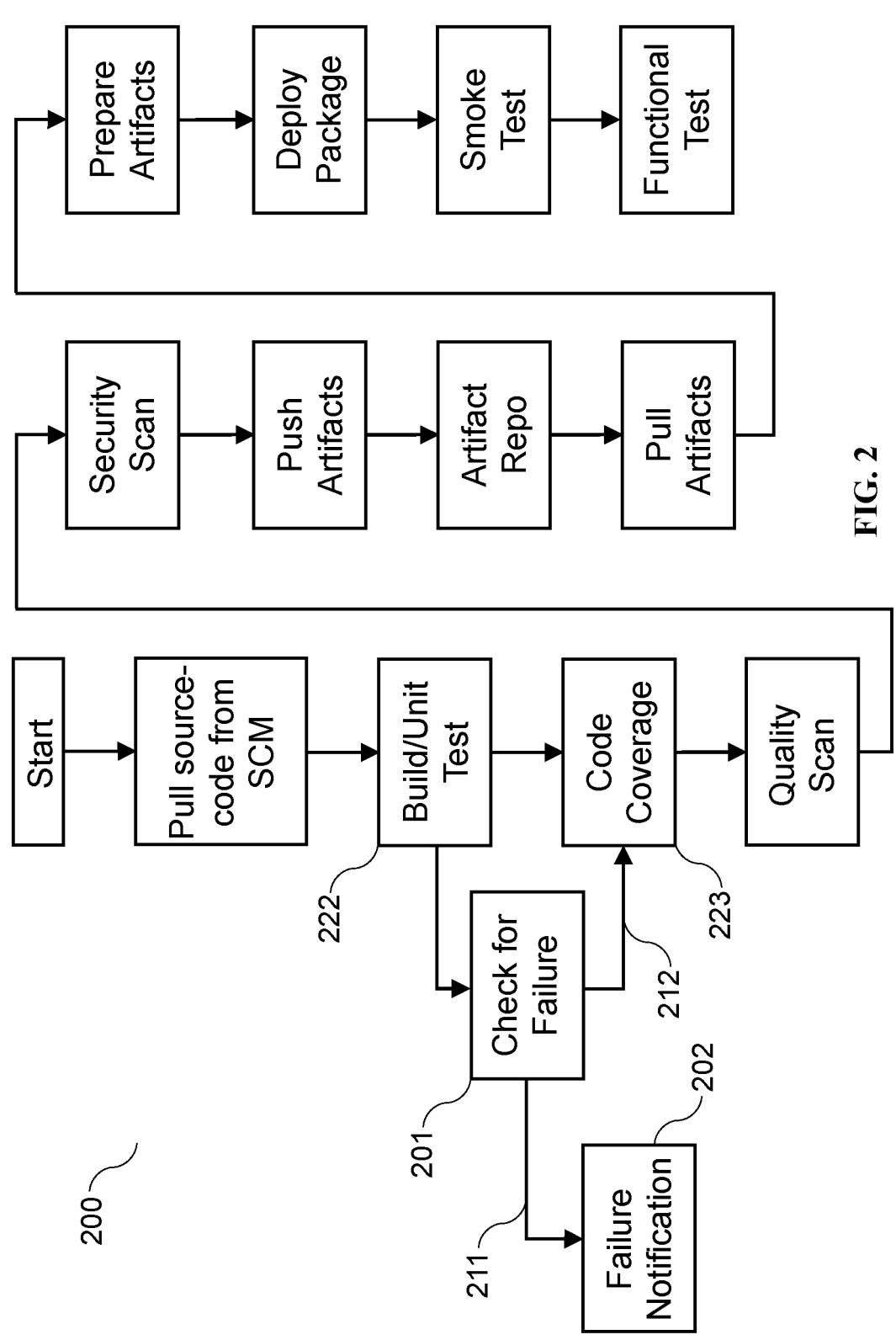
FIG. 2 depicts a CI/CD enterprise pipeline according to one or more embodiments of the disclosure.

FIG. 2 is a diagram illustrating a CI/CD enterprise pipeline as described by the disclosed embodiments. FIG. 2 is not intended to be an exhaustive or limited example of a CI/CD enterprise pipeline to the form disclosed. The diagram was chosen to explain the principles of a CI/CD enterprise pipeline and the practical application and to enable others of ordinary skill in the art to understand the disclosure for various implementation(s) with various modifications and/or any combinations of implementation(s) as are suited to the particular use contemplated.

A CI/CD enterprise pipeline 200 comprises several consecutive stages that are performed along the pipeline. The CI/CD enterprise pipeline of the embodiments features a gate 201 to make sure code adheres to the standards defined in the Definition of Done (DoD), which exists between each successive stages along the pipeline (illustrated between stage 222 and stage 223 of the CI/CD enterprise pipeline in FIG. 2). The gate 201, ensures compliance with the standard defined in the DoD for the previous stage before proceeding to the subsequent stage. If a stage fails to adhere to the standard defined in the DoD 211, the pipeline stops and a failure notification 202 is sent to all stakeholders participating in resolving the issue. If a stage complies with the standard defined in the DoD 212, the pipeline proceeds as normal to the subsequent stage.

The innovative system and a technical solution described herein can be referred to as the "CI/CD template framework." The CI/CD template framework described herein is an improvement over systems of the prior art, providing a technical solution that affords the integration of applications into user systems, including other aspects described herein. The CI/CD template framework disclosed herein provides all of the information that a CI server needs to assemble or instantiate the CI/CD pipeline. The CI/CD template framework, created in accordance with the description herein, can be utilized to configure the CI/CD pipeline (i) to build the relevant application(s) and/or test the same, (ii) for the tests that need to be run, and (iii) to ensure the testing environment emulates the final production environment. By utilizing the CI/CD template framework described herein, these tasks can be performed quicker and with less error and increased repeatability. This CI/CD template framework blends various scripting languages such as Groovy, Python, Shell, PowerShell, and Domain-Specific Language (DSL) to build rich, home-grown shared libraries and template. In certain embodiments, the CI/CD template framework can be built for leveraging design patterns, such as a Façade design pattern, to shield the complex work involved with building a "Pipeline-as-Code." Behind the Façade, the templates are built in Citizant's or a customer's cloud environment and mapped to shared libraries using a Mediator pattern, thus allowing yet another layer of abstraction, e.g., de-duplication, that enables the templates and shared libraries to grow independently without impacting the customer, thereby improving the upgradability, and integrations, and interfacing of applications in an organization's computation structure. From an end user's perspective, the way the user interacts with the CI/CD template framework can be via a Jenkinsfile. The Jenkins Core is one exemplary enterprise CI server that can be incorporated into embodiments described herein to orchestrate all stages of CI and CD pipelines. A rich Jenkins plugin ecosystem enables improved and expedited integration of the CI/CD template framework as set forth herein.

A CI/CD Template Framework architecture enables smart Jenkinsfile mapping to various environment-configuration templates, which can utilize a combination of one or more programming and scripting languages such as Java, Groovy, Shell, PowerShell, and Python. As one particular embodiment of the pipeline construct, these scripting languages can allow for the development and deployment of a CI/CD pipeline on any OS platform, e.g., Linux or Windows, by automatically calling the appropriate shared libraries and configuring them according to application-specific parameters included in the application team's Jenkinsfile. In one embodiment, Groovy and Python compilers can be used to test the integrity of the instructions in a CI/CD Template Framework, thereby resulting in computing systems having improved integrity and proper operation.

The environment-specific templates, which are created by stitching together various technology tool stacks as mentioned on a subsequent page, are mapped to many shared functions. FIG. 1 shows how the CI/CD template framework instantiates the CI/CD pipeline by binding the appropriate template as specified by the development team in its Jenkinsfile. The environment-specific templates and shared functions are considered "first-class" artifacts and can be version controlled within a source code repository. Embodiments utilizing Jenkinsfile configurations improve projection management by requiring project teams to populate only atomic-level details about the technology stack, source code, and build tools. The environment-specific templates that are referenced within a Jenkinsfile are written to address the tools and technologies required for CI/CD pipeline configurations for various applications and servers, such as standard Java, Web deployments on a JBoss application server, batch deployments, Informatica (for data Extract, Transform, and Load, or ETL), Oracle/Greenplum, microservices, etc.

For example, one embodiment of a Jenkinsfile specifically maps to the environment-specific template, which in turn maps to a specific technology as depicted in FIG. 1. This allows for the extension of the Jenkinsfile to map to various environment-specific templates as they are created. With this extensible approach, an environment-specific template can be set up for any application with various technology tool stacks such as C, C++, Cobol/ALC AngularJS, etc., in any on-premises or cloud environment for containerized or non-containerized deployment. Allowing a CI/CD pipeline to be built as code can enable the CI/CD pipeline to be agnostic to the infrastructure on which it was run, such as an on-premises data center, on the cloud, and/or on containers. An analogy to this functionality would be to a shipping container: as long as the items in the shipping container are secured, it will not matter if the shipping container is transported via train, road, sea, or air.

Certain embodiments comprise an application-facing Jenkinsfile with key-value pairs as the core of a CI/CD template framework, which saves development teams significant staff and budget resources by empowering development teams to self-onboard their applications to the pipeline tour times faster while meeting security, quality and, governance standards. The improved methods described herein allow development teams to simply populate a Jenkinsfile with information on their project's technology tool stack, source code repository details, and the like, rather than project teams building their DevSecOps pipeline from scratch for various pipeline stages as shown in FIG. 2. The DSL-rich Jenkinsfile can be mapped to a specific technology template based on the application's technology profile. Applications can be coded using varied technologies (Java, C, C++, C#, .NET, AngularJS, JavaScript, Cobol, ALC, etc.). Thus, a CI/CD template framework can be advantageously built to satisfy these project teams and their different technology profiles.

Since project scope and requirements can vary significantly from one project to the next, embodiments described herein were created to build one or more templates mapped to these coding and environment technologies as outlined in FIG. 1 to expose these templates for use via a Jenkinsfile. This can allow for a quicker, and less error-prone onboarding of projects across many distinct types of organizations utilizing varying technologies.

In the CI/CD template framework as depicted in FIG. 1, a first sub-system can maintain project source code repository using a Jenkinsfile and the project source code. A second sub-system can maintain a shared template library and a shared scripting library which can be used to create a CI/CD source code repository. Templates and shared functions can be maintained to satisfy a project's need to quickly move the desired features into production via embodiments of a CI/CD pipeline. This framework can be powered by in-house developed shared libraries to create, build, and execute all stages of the CI and CD pipelines.

FIG. 2 illustrates an embodiment of a CI/CD pipeline orchestrated by Jenkins with continuous feedback, which can provide notification of any errors. As part of lean principles and Six Sigma, there is a paramount need to have a continuous feedback loop. The CI/CD template frameworks of the present disclosure establish a continuous feedback loop by allowing projects to control who, when, how, and what should be notified, which is achieved by developers updating the parameters in their Jenkinsfile.

As part of framework CI/CD template framework, a Jenkinsfile can reside in a project source code repository. Technology-specific templates and shared libraries can be stored in the CI/CD source code repository. Segregation of duties can allow for a cleaner distinction of roles and responsibilities and maintains accountability—with all files considered as first-class artifacts that are version-controlled and under confirmation management. This configuration allows project teams to self-onboard quickly by filling in the Jenkinsfile with need-to-know information. In parallel, a CI/CD team focuses on constantly innovating and adding new templates to the CI/CD template library for new technology stacks and environments. The CI/CD team also authors shared libraries to enable new capabilities to get integrated into a CI/CD pipeline, with quality, security, compliance, and governance already integrated into the system.

Embodiments of a CI/CD template framework can be highly extensible and portable, which allows for the continuous enhancement and addition of incremental technical improvements to existing systems over time.

A CI/CD template framework can provide a platform for application development teams to onboard to the CI/CD pipeline quickly, without doing any deep learning about the intricacies of DevSecOps, feel empowered to dramatically improve their team's capabilities, and improve the integration of preexisting applications and components within an organization utilizing the CI/CD pipeline. This effective-efficient-empowered approach works for various applications and environments. Embodiments of the systems described herein can provide the surprisingly improved result of quickly onboarding projects using this new framework. In one exemplary embodiment, onboarding for a typical project was reduced from over 900 minutes to as little as 15 minutes using a CI/CD template framework as set forth herein.

In exemplary embodiments, the features of the CI/CD pipeline can be implemented, and the technological solutions of the CI/CD template framework can be specifically demonstrated as follows:

A CI/CD template framework can be used to onboard applications to a CI/CD pipeline, thereby streamlining the process of integrating applications into an organization's system. In an exemplary embodiment, the list of steps required for onboarding of applications to the CI/CD pipeline using the CI/CD template framework was simplified as exemplified by the following:

1. Create the CI and CD pipelines with <standard_naming>.CI and <standard_naming>.CD.
2. Copy the 'JAVA_Jenkinsfile_Templates' of "cicd-onhoarding.git' repository into your Git branch and rename it to your project-specific Jenkinsfile name.
3. Update the values in the Jenkinsfile with project-specific information.
4. Reference the created Jenkinsfile under the 'Pull Pipeline Script for SCM' section of both the CI and CD pipeline to pull from your git branch.
5. Test both the CI and CD pipelines.
6. After all stages of CI and CD are completed, have the project team check-in the Jenkinsfile into the project's SCM (Rational Team Concert, (pit, etc.).
7. Update the 'Pull Pipeline Script from SCM" section of both the CI and CD pipelines to reference the project's SCM.

Projects and/or applications can self-onboarded to the CI/CD pipeline without being required to change their application structure or tool usage. Projects can simply fill in a mapping file, e.g., Jenkinsfile, to specify their application's structure and requirements. As described in FIG. 1, a project team may only need to input pertinent information about their project like which technology stack they use, location of their source code, recipients to send failure notifications to, build triggers, etc., which is analogous to taking an order at a restaurant and then building the dish to perfection and meeting customers requirement. Prior art systems require significantly more information to operate and achieve the results set forth herein. A CI/CD template framework can handle the rest of the onboarding process. A CI/CD template framework's Jenkinsfile may use a universally recognized language of key-value pair which is simple to read, understand, and manage. Before a CI/CD template framework, project teams were typically required to dedicate 200 hours to participating with the CI/CD team in working sessions and setting up their pipelines, whereas in an exemplary embodiment this time was reduced to a minimum of 1 hour required to populate the values in the Jenkinsfile and then validate all stages of pipeline execution.

Significant time savings have been realized with regard to onboarding projects using a CI/CD template framework. Prior art systems, without the CI/CD template framework's parameterized Jenkinsfile, traditionally require 2-3 months on average to onboard an application and complete all stages of the CI/CD pipeline. Using embodiments of the disclosed CI/CD template framework, can result in implementation of applications in very little time because all that may be required is the commission of one or more Jenkinsfiles, which is bound to the pre-built environment-specific template, into their source code repository. For example, an Informatica-based ETL application with 4 components and a Greenplum application with 6 components historically would have taken 4-6 months for onboarding to an individual CI/CD pipeline. In an exemplary embodiment, a CI/CD template framework enabled the onboarding of all 10 components of this system in about 22 minutes.

A CI/CD template framework can offer a clean separation of duties between project management teams and personnel, allowing project teams to focus on their primary of building new business functionalities. Meanwhile, the CI/CD team creates and expands the template library and builds new capabilities by creating shared functions. In an exemplary embodiment, a CI/CD team was able to develop one new template per week to handle various technology stacks, which is not achievable with any of the platforms in the prior art.

A CI/CD template framework's templates can be highly extensible, allowing the framework to advantageously accommodate every technology and platform used by any project coming onboard a CI/CD pipeline. This extensibility has been demonstrated by onboarding projects that used tools not previously incorporated into the CI/CD pipeline. In an exemplary embodiment, an application containing 740,000 lines of Java code, was onboarded on the CI/CD pipeline in less than 4 hours using a CI/CD template framework, which is not possible with methods of the prior art.

A CI/CD template framework is portable to work in any environment. In some embodiments, a CL/CD pipeline can be seamlessly ported into to an AWS Gov Cloud environment hosted by a federal agency utilizing a CI/CD template framework. In an exemplary embodiment, all stages of a CI/CD pipeline were deployed using a sample application with more than 200 rulesets in approximately 2 hours, which would have taken days, if not weeks to implement using methods of the prior art.

The description of the present disclosure has been presented for purposes of illustration and description, but is not intended to be exhaustive or limited to the disclosure in the form disclosed. Many modifications, variations, substitutions, and any combinations thereof will be apparent to those of ordinary skill in the art without departing from the scope and spirit of the disclosure. The implementation(s) were chosen and described in order to explain the principles of the disclosure and the practical application, and to enable others of ordinary skill in the art to understand the disclosure for various implementation(s) with various modifications and/or any combinations of implementation(s) as are suited to the particular use contemplated.

The invention claimed is:

1. A method for constructing a continuous integration and continuous delivery (CI/CD) pipeline, the method comprising:

receiving a Jenkinsfile comprising a structured key-value schema that defines project-specific metadata, technology stack parameters, and environment configurations;

extracting metadata from a project source code repository based on the key-value schema;

selecting and importing a technology-specific template from a template library, wherein the template is dynamically bound based on the technology stack parameters;

selecting and importing an environment-configuration template from a shared library, wherein the environmental-configuration template is specified in the Jenkinsfil, and the environmental-configuration template comprises at least one of scripting or programming language instructions, or a combination thereof, and is mapped using a Mediator design pattern;

assembling, by a CI server, a CI/CD pipeline using the Jenkinsfile, the extracted metadata, the selected technology-specific template, and the selected environment-configuration template;

applying a Façade design pattern to abstract pipeline orchestration logic from an application team;

enforcing a Definition of Done (DoD) between each pipeline stage using automated control gates, wherein the control gates include at least one of static code analysis, code quality threshold validation, security vulnerability scanning, compliance checks, or test coverage enforcement, or a combination of two or more thereof; and enabling deployment of the application to one or more environments without human intervention.

2. The method of claim 1, wherein the one or more environments comprises at least one of cloud, on-premises, or hybrid infrastructure, or a combination or two or more thereof.

3. The method of claim 1, wherein the Jenkinsfile is authored by the application team using declarative configuration, and wherein the pipeline is instantiated without requiring scripting knowledge or modification of the application's source code structure.

4. The method of claim 1, wherein the technology-specific and environment-configuration templates are version-controlled independently and treated as first-class artifacts within a CI/CD source code repository.

5. The method of claim 1, wherein the CI/CD pipeline integrates with infrastructure provisioning and migration tools including Ansible Tower and RedHat Application Migration Toolkit to automate at least one of virtual machine setup, patching, or legacy application modernization, or a combination of two or more thereof.

6. The method of claim 1, wherein each control gate defined in the Definition of Done is enforced automatically, and wherein a failure to meet any threshold halts pipeline progression and triggers stakeholder notifications as defined in the Jenkinsfile.

7. The method of claim 1, wherein the technology-specific template supports a distinct tool stack selected from the group consisting of build tools, source-code repositories, programming languages, operating systems, application servers, container orchestration platforms, and hosting environments, and combinations thereof.

8. The method of claim 1, wherein the technology-specific template supports at least ten distinct tool stacks, each of the at least ten distinct tool stacks selected from the group consisting of build tools, source-code repositories, programming languages, operating systems, application servers, container orchestration platforms, and hosting environments, and combinations thereof.

9. The method of claim 1, wherein the CI/CD pipeline supports cross-language deployment by isolating application logic from environment-specific configurations through containerization and template abstraction.

10. The method of claim 1, wherein the CI/CD pipeline is orchestrated using a Jenkins server and leverages shared libraries written in one or more scripting languages selected from the group consisting of Groovy, Python, Shell, and PowerShell.

11. The method of claim 1, wherein the Jenkinsfile includes parameters that define at least one of notification rules, build triggers, recipient lists, or escalation paths, or a combination of two or more thereof, for failure alerts, and wherein these parameters are interpreted by the CI server during pipeline execution.

12. The method of claim 1, wherein the CI/CD pipeline is instantiated in less than 30 minutes for applications exceeding 500,000 lines of code, and wherein onboarding is completed without requiring changes to at least one of application structure, tool usage, or manual configuration, or a combination of two or more thereof.

13. A CI/CD template framework, the CI/CD template framework comprising:

a Jenkinsfile comprising a structured key-value schema that defines project-specific metadata, technology stack parameters, and environment configurations;

a project source code repository from which metadata that is extracted based on the Jenkinsfile;

a template library comprising technology-specific templates, wherein a template is dynamically selected and bound based on the technology stack parameters;

a shared library comprising environment-configuration templates, wherein each environment-configuration template comprises scripting or programming languages instructions and is mapped using a Mediator design pattern;

a CI server configured to assemble a CI/CD pipeline using the Jenkinsfile, the extracted metadata, the selected technology-specific template, and the selected environment-configuration template;

a Façade design pattern applied to abstract pipeline orchestration logic from the application team;

automated control gates between pipeline stages enforcing a Definition of Done (DoD), wherein the automated control gates include at least one of static code analysis, code quality threshold validation, security vulnerability scanning, compliance checks, or test coverage enforcement, or a combination of two or more thereof; and a deployment engine comprising at least one processor, is configured to deploy the application to one or more environments.

14. The CI/CD template framework of claim 13, wherein the one or more environments comprises at least one of cloud, on-premises, or hybrid infrastructure, or a combination or two or more thereof.

15. The CI/CD template framework of claim 13, wherein the Jenkinsfile is authored by the application team using declarative configuration, and wherein the pipeline is instantiated without requiring scripting knowledge or modification of the application's source code structure.

16. The CI/CD template framework of claim 13, wherein the technology-specific and environment-configuration templates are version-controlled independently and treated as first-class artifacts within a CI/CD source code repository.

17. The CI/CD template framework of claim 13, wherein the CI/CD pipeline integrates with infrastructure provisioning and migration tools including Ansible Tower and RedHat Application Migration Toolkit to automate at least one of virtual machine setup, patching, or legacy application modernization, or a combination of two or more thereof.

18. The CI/CD template framework of claim 13, wherein each control gate defined in the Definition of Done is enforced automatically, and wherein failure to meet any threshold halts pipeline progression and triggers stakeholder notifications as defined in the Jenkinsfile.

19. The CI/CD template framework of claim 13, wherein the technology-specific template supports a distinct tool stack selected from the group consisting of build tools, source-code repositories, programming languages, operating systems, application servers, container orchestration platforms, and hosting environments, and combinations thereof.

20. The CI/CD template framework of claim 13, wherein the technology-specific template supports at least ten distinct tool stacks, each of the at least ten distinct tool stacks selected from the group consisting of build tools, source-code repositories, programming languages, operating systems, application servers, container orchestration platforms, and hosting environments, and combinations thereof.

21. The CI/CD template framework of claim 13, wherein the CI/CD pipeline supports cross-language deployment by isolating application logic from environment-specific configurations through containerization and template abstraction.

22. The CI/CD template framework of claim 13, wherein the CI/CD pipeline is orchestrated using a Jenkins server and leverages shared libraries written in one or more scripting languages selected from the group consisting of Groovy, Python, Shell, and PowerShell.

23. The CI/CD template framework of claim 13, wherein the Jenkinsfile includes parameters that define notification rules, build triggers, recipient lists, or escalation paths, or a combination of two or more thereof, for failure alerts, and
wherein these parameters are interpreted by the CI server during pipeline execution.

24. The CI/CD template framework of claim 13, wherein the CI/CD pipeline is instantiated in less than 30 minutes for applications exceeding 500,000 lines of code, and
wherein onboarding is completed without requiring changes to at least one of application structure, tool usage, or manual configuration, or a combination of two or more thereof.

* * * * *